United States Patent
Zhang et al.

(10) Patent No.: US 12,444,404 B2
(45) Date of Patent: Oct. 14, 2025

(54) STREAMING END-TO-END SPEECH RECOGNITION METHOD, APPARATUS AND ELECTRONIC DEVICE

(71) Applicant: Alibaba Group Holding Limited, Grand Cayman (KY)

(72) Inventors: Shiliang Zhang, Hangzhou (CN); Zhifu Gao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 363 days.

(21) Appl. No.: 17/976,464

(22) Filed: Oct. 28, 2022

(65) Prior Publication Data
US 2023/0064756 A1 Mar. 2, 2023

Related U.S. Application Data

(63) Continuation of application No. PCT/CN2021/089556, filed on Apr. 25, 2021.

(30) Foreign Application Priority Data

Apr. 30, 2020 (CN) .......................... 20201036690.7

(51) Int. Cl.
  *G10L 15/00* (2013.01)
  *G10L 15/02* (2006.01)
  *G10L 15/06* (2013.01)
(52) U.S. Cl.
  CPC ............ *G10L 15/063* (2013.01); *G10L 15/02* (2013.01)
(58) Field of Classification Search
  CPC ... G10L 15/02; G10L 15/00; G10L 2015/022; G10L 2015/025; G10L 2015/027;
  (Continued)

(56) References Cited

U.S. PATENT DOCUMENTS

| | | | |
|---|---|---|---|
| 11,145,293 B2 * | 10/2021 | Prabhavalkar | .......... G10L 15/02 |
| 2018/0330718 A1 * | 11/2018 | Hori | .......... G06N 3/08 |
| 2020/0027444 A1 * | 1/2020 | Prabhavalkar | .......... G10L 15/02 |

FOREIGN PATENT DOCUMENTS

| | | |
|---|---|---|
| CN | 105355197 A | 2/2016 |
| CN | 107680597 A | 2/2018 |

(Continued)

OTHER PUBLICATIONS

Li, M., Liu, M., & Masanori, H. (2019, May). End-to-end speech recognition with adaptive computation steps. In ICASSP 2019-2019 IEEE International Conference on Acoustics, Speech and Signal Processing (ICASSP) (pp. 6246-6250). IEEE. (Year: 2019).*

(Continued)

*Primary Examiner* — Edgar X Guerra-Erazo
(74) *Attorney, Agent, or Firm* — Lee & Hayes, P.C.

(57) ABSTRACT

A method, an apparatus, and an electronic device for streaming end-to-end speech recognition are described. The method includes: extracting and encoding speech acoustic features of a received voice stream in units of frames; performing block processing, and predicting a number of activation points included in a same block that need to be encoded and outputted; determining position(s) of activation point(s) that need(s) to be decoded and outputted according to a prediction result, to a decoder to perform decoding at the position(s) of the activation point(s) and output a recognition result. Through the embodiments of the present disclosure, the robustness of a streaming end-to-end speech recognition system to noise can be improved, thereby improving the performance and the accuracy of the system.

18 Claims, 15 Drawing Sheets

(58) Field of Classification Search
CPC ....... G10L 15/083; G10L 15/08; G10L 15/12; G10L 15/16; G10L 15/197; G10L 2015/221; G10L 15/285; G10L 15/30; G10L 15/32; G10L 15/34; G10L 15/28; G10L 17/02; G10L 17/06; G10L 17/12; G10L 17/18; G10L 17/20; G10L 17/22; G06N 3/045; G06N 3/0442; G06N 3/044; G06N 3/0455; G06N 3/0464; G06N 3/047; G06N 3/0475; G06N 3/048
See application file for complete search history.

(56) References Cited

FOREIGN PATENT DOCUMENTS

| | | |
|---|---|---|
| CN | 109979440 A | 7/2019 |
| CN | 110473529 A | 11/2019 |
| CN | 110556099 A | 12/2019 |
| CN | 110689879 A | 1/2020 |
| KR | 100434522 | 11/1998 |

OTHER PUBLICATIONS

Moritz, N., Hori, T., & Le Roux, J. (2019, May). Triggered attention for end-to-end speech recognition. In ICASSP 2019-2019 IEEE International Conference on Acoustics, Speech and Signal Processing (ICASSP) (pp. 5666-5670). IEEE. (Year: 2019).*
Chiu et al, Monotonic Chunkwise Attention, Google Brain, published as a conference papter at ICLR 2018, 16 pages.
Extended European Search Report mailed Mar. 25, 2024 for European Application No. 21796134.1, 6 pages.
Tian, et al, "Synchronous Transformers for End-to-End Speech Recognition", Dec. 6, 2019, 5 pages.
English Translation of Chinese 1st Office Action of Chinese application No. 202010366907 dated Dec. 28, 2023, for corresponding U.S. Appl. No. 17/976,464, 4 pages.
Translation of PCT International Search Report for corresponding PCT application No. PCT/CN2021/089556 mailed Nov. 4, 2021, a counterpart foreign application for U.S. Appl. No. 17/976,464, 3 pages.
Translation of PCT Written Opinion for corresponding PCT application No. PCT/CN2021/089556 mailed Oct. 30, 2022, a counterpart foreign application for U.S. Appl. No. 17/976,464, 4 pages.
Written Opinion for Singapore Application No. 11202254045Q, Dated Sep. 4, 2025, 10 pages.

* cited by examiner

STREAMING END-TO-END SPEECH RECOGNITION METHOD, APPARATUS AND ELECTRONIC DEVICE

CROSS REFERENCE TO RELATED PATENT APPLICATIONS

This application claims priority to and is a continuation of PCT Patent Application No. PCT/CN2021/089556 filed on 25 Apr. 2021, and is related to and claims priority to Chinese Application No. 202010366907.5, filed on 30 Apr. 2020 and entitled "Streaming End-to-End Speech Recognition Method, Apparatus and Electronic Device," which are incorporated herein by reference in their entirety.

TECHNICAL FIELD

The present disclosure relates to the technical field of streaming end-to-end speech recognition, and in particular, to methods, apparatuses, and electronic devices for streaming end-to-end speech recognition.

BACKGROUND

Speech recognition technology is a technology that allows machines to convert speech signals into corresponding text or commands through processes of recognition and understanding. Among them, end-to-end speech recognition has received more and more attention from academia and industry. Compared with traditional hybrid-based systems, the end-to-end speech recognition optimizes acoustic models and language models through a model combination, which can not only greatly reduce the complexity of system training, but also obtain a significant improvement in performance. However, most end-to-end speech recognition systems mainly perform offline speech recognition, and cannot perform streaming real-time speech recognition. In other words, it is possible to perform speech recognition and output a recognition result after a user has finished speaking a sentence, but cannot output a recognition result when the voice is heard.

At present, some researchers have proposed the solution of streaming end-to-end speech recognition, but the effect is not obvious. For example, a MoCHA model implements a streaming end-to-end speech recognition solution based on an attention mechanism (Attention-Encoder-Decoder) end-to-end speech recognition system. In MoCHA, streaming voice information can first be converted into speech acoustic features and inputted to an encoder, and then an activation point that needs to be decoded and outputted is determined through an Attention module. A decoder outputs a specific recognition result (also called as token, for example, a Chinese character can correspond to a token) at a position of the activation point.

When an Attention model is trained, it is usually necessary to use a complete sentence of speech as a sample, and mark a position of the activation point in the speech to complete the training of the Attention model. However, when making predictions through the Attention model, since the streaming speech recognition is performed, what is inputted into the model is streaming speech information, rather than corresponding to a complete sentence. Therefore, the way of the Attention model is to calculate an Attention coefficient for each frame of a received voice stream, and then determine an activation point by comparing with a preset threshold. For example, if an Attention coefficient of a certain frame exceeds the threshold, it can be used as an activation point, and the Decoder is informed to output a token at the position of the activation point. As can be seen in the MoCHA solution, there is a large mismatch between training and testing, and this mismatch makes MoCHA less robust to noise, which makes MoCHA-based streaming end-to-end speech recognition systems face a large performance loss in practical tasks. In addition, since the input end is a continuous streaming speech signal, when an Attention coefficient of a certain frame is calculated, the situation of future voice frames is not known. Therefore, even if the Attention coefficient of the current frame is greater than the threshold, a situation in which the Attention coefficient of the next frame is larger than that of the current frame may exist. In this case, it may be more accurate to use the next frame as the activation point. As can be seen in the MoCHA solution, there also exists a problem of relatively low accuracy of positioning an activation point.

Therefore, how to improve the robustness of a streaming end-to-end speech recognition system to noise, thereby improving the performance and accuracy of the system, has become a technical problem that needs to be solved by one skilled in the art.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer readable instructions as permitted by the context above and throughout the present disclosure.

The present disclosure provides streaming end-to-end speech recognition method, apparatus, and electronic device, which can improve the robustness of a streaming end-to-end speech recognition system to noise, thereby improving the performance and accuracy of the system.

The present disclosure provides the following solutions:

A streaming end-to-end speech recognition method includes:
   extracting and encoding speech acoustic features of a received voice stream in units of frames;
   performing block processing on encoded frames, and predicting a number of activation points included in a same block that need to be encoded and outputted; and
   determining a position of an activation point that needs to be decoded and outputted according to a prediction result, to allow a decoder to perform decoding at the position of the activation point and output a recognition result.

A method of building a predictive model includes:
   obtaining a training sample set, the training sample set including a plurality of block data and labeling information, wherein each block data frame includes an encoding result of respectively encoding multiple frames of a voice stream, and the labeling information includes a number of activation points included in each block that need to be decoded and outputted; and
   inputting the training sample set into a predictive model for model training.

A method of providing speech recognition services includes:

receiving, by a cloud service system, a voice stream provided by an application system after receiving a calling request from the application system;

extracting and encoding speech acoustic features of a received voice stream in units of frames;

performing block processing on encoded frames, and predicting a number of activation points included in a same block that need to be encoded and outputted;

determining a position of an activation point that needs to be decoded and outputted according to a prediction result, to allow a decoder to perform decoding at the position of the activation point to obtain a speech recognition result; and returning the speech recognition result to the application system.

A method for obtaining speech recognition information includes:

submitting, by an application system, a call request and a voice stream to be recognized to a cloud service system by invoking an interface provided by the cloud service system, the cloud service system extracting speech acoustic features of the received voice stream in units of frames and performing encoding, performing block processing on encoded frames, and predicting a number of activation points included in a same block that need to be encoded and outputted; performing decoding at the position of the activation point to obtain a speech recognition result after determining a position of an activation point that needs to be decoded and outputted according to a prediction result; and receiving the speech recognition result returned by the cloud service system.

A method for implementing a court's self-service case filing includes:

receiving, by a self-service case-filing all-in-one machine device, case-filing request information inputted by voice;

extracting and encoding speech acoustic features of a received voice stream in units of frames;

performing block processing on encoded frames, and predicting a number of activation points included in a same block that need to be encoded and outputted;

determining a position of an activation point that needs to be decoded and outputted according to a prediction result, to allow a decoder to perform decoding at the position of the activation point and determine a recognition result; and entering the recognition result into an associated case-filing information database.

A method for upgrading terminal device includes:

providing upgrade advice information to a terminal device; and granting the terminal device an authority to perform streaming speech recognition in an upgraded manner after receiving an upgrade request submitted by the terminal device, performing the streaming speech recognition in the upgraded manner including: extracting and encoding speech acoustic features of a voice stream in units of frames, performing block processing on encoded frames, and predicting a number of activation points included in a same block that need to be encoded and outputted; and obtaining a speech recognition result by performing decoding at a position of an activation point through a decoder after determining the position of the activation point based on a prediction result.

A streaming end-to-end speech recognition apparatus comprising:

an encoding unit configured to extract and encode speech acoustic features of a received voice stream in units of frames;

a prediction unit configured to perform block processing on encoded frames, and predict a number of activation points included in a same block that need to be encoded and outputted; and an activation point position determination unit configured to determine a position of an activation point that needs to be decoded and outputted according to a prediction result, to allow a decoder to decode and output a recognition result at the position of the activation point.

An apparatus for building a predictive model includes:

a training sample set acquisition unit configured to obtain a training sample set, the training sample set including a plurality of block data and labeling information, wherein each block data frame includes an encoding result of respectively encoding multiple frames of a voice stream, and the labeling information includes a number of activation points included in each block that need to be decoded and outputted; and an input unit configured to input the training sample set into a predictive model for model training.

An apparatus for providing speech recognition services, which is applied in a cloud service system, includes:

a voice stream receiving unit configured to receive a voice stream provided by an application system after receiving a calling request from the application system;

an encoding unit configured to extract and encode speech acoustic features of a received voice stream in units of frames;

a prediction unit configured to perform block processing on encoded frames, and predict a number of activation points included in a same block that need to be encoded and outputted;

an activation point position determination unit configured to determine a position of an activation point that needs to be decoded and outputted according to a prediction result, to allow a decoder to perform decoding at the position of the activation point to obtain a speech recognition result; and a recognition result returning unit configured to return the speech recognition result to the application system.

An apparatus for obtaining speech recognition information, which is applied in an application system, includes:

a submission unit configured to submit a call request and a voice stream to be recognized to a cloud service system by invoking an interface provided by the cloud service system, the cloud service system extracting speech acoustic features of the received voice stream in units of frames and performing encoding, performing block processing on encoded frames, predicting a number of activation points included in a same block that need to be encoded and outputted, and performing decoding at the position of the activation point to obtain a speech recognition result after determining a position of an activation point that needs to be decoded and outputted according to a prediction result; and a recognition result receiving unit configured to receive the speech recognition result returned by the cloud service system.

An apparatus for implementing a court's self-service case filing, which is applied in a self-service case-filing all-in-one machine, includes:

a request receiving unit configured to receive case filing request information through voice input;

an encoding unit configured is used to extract and encode speech acoustic features of a received voice stream in units of frames;

a prediction unit configured to perform block processing on encoded frames, and predict a number of activation points included in a same block that need to be encoded and outputted;

an activation point position determination unit configured to determine a position of an activation point that needs to be decoded and outputted according to a prediction result, to allow a decoder to perform decoding at the position of the activation point and determine a recognition result; and an information entry unit configured to enter the recognition result into an associated case-filing information database.

An apparatus for upgrading a terminal device, includes:

an upgrade suggestion providing unit configured to provide upgrade advice information to a terminal device; and an authority granting unit configured to grant the terminal device an authority to perform streaming speech recognition in an upgraded manner after receiving an upgrade request submitted by the terminal device, performing the streaming speech recognition in the upgraded manner including: extracting and encoding speech acoustic features of a voice stream in units of frames, performing block processing on encoded frames, and predicting a number of activation points included in a same block that need to be encoded and outputted; and obtaining a speech recognition result by performing decoding at a position of an activation point through a decoder after determining the position of the activation point based on a prediction result.

According to the embodiments provided by the present disclosure, the present disclosure discloses the following technical effects:

Through the embodiments of the present disclosure, in the process of recognizing a voice stream, encoded frames can be divided into blocks, and the number of activation points included in the blocks that need to be decoded and outputted can be predicted. In this way, based on a prediction result, a specific position of an activation point in a specific block can be determined, so as to instruct the decoder to decode and output a recognition result at the corresponding position of the activation point. Since this approach no longer needs to compare Attention coefficients with a threshold to determine positions of activation points, and is not affected by future frames, the accuracy can be improved. In addition, since a higher accuracy is easier to be obtained by the process of predicting the number of activation points included in the blocks, the mismatch between training and prediction is relatively lower, thus improving the robustness of the streaming end-to-end speech recognition system to noise, and having a relatively small impact on the performance of the system.

Apparently, implementing any product of the present disclosure does not necessarily need to achieve all of the advantages described above at the same time.

BRIEF DESCRIPTION OF THE DRAWINGS

In order to more clearly illustrate the technical solutions in the embodiments of the present disclosure, accompanying drawings needed in the embodiments will be briefly introduced below. Apparently, the drawings in the following description represent only some of the present disclosure. One of ordinary skill in the art can also obtain other drawings based on these drawings without making any creative effort.

DETAILED DESCRIPTION

The technical solutions in the embodiments of the present disclosure will be clearly and completely described below with reference to the drawings in the embodiments of the present disclosure. Apparently, the described embodiments represent only some and not all of the embodiments of the present disclosure. Based on the embodiments in the present disclosure, all other embodiments obtained by one of ordinary skill in the art shall fall within the scope of protection of the present disclosure.

Figure 1:
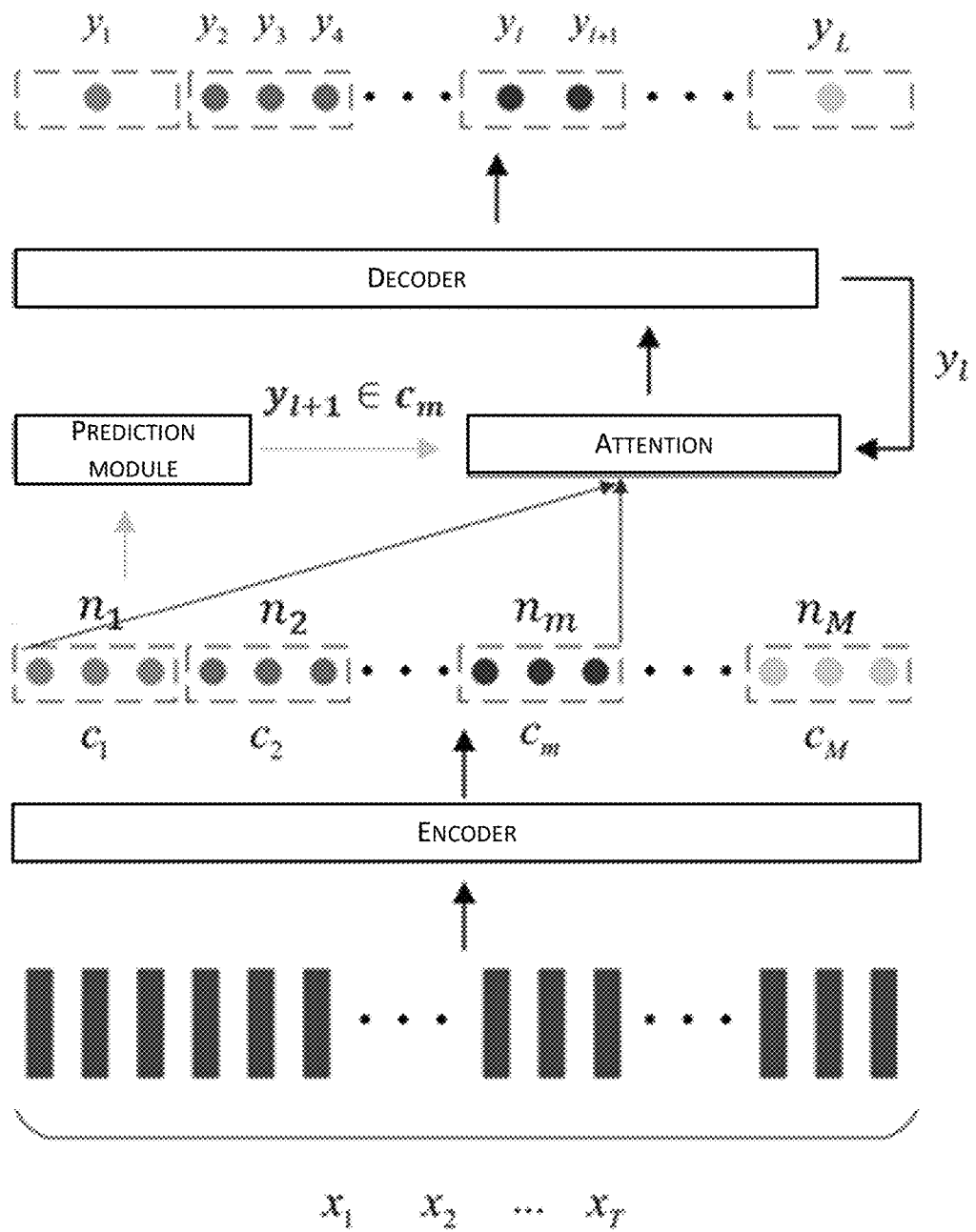
FIG. 1 is a schematic diagram of a solution provided by the embodiments of the present disclosure.

In the embodiments of the present disclosure, in order to improve the robustness of a streaming end-to-end speech recognition system to noise, thereby improving the performance of the system, as shown in FIG. 1, a prediction module can be added to the end-to-end speech recognition system that is based on an attention mechanism. Functions of the prediction module include: first, an output of an encoder can be divided into blocks, for example, every 5 frames as one block, etc. The number of activation points (tokens) included in each block that need to be decoded and outputted can be predicted. Afterwards, position(s) of activation point(s) can be determined through a prediction result of the number of activation points included in each block, and a decoder can then be instructed to decode and output at the position(s) of the activation point(s). For example, in implementations, since the number of activation points included in each block is predicted, the position(s) of the activation point(s) can be determined with the help of information such as an Attention coefficient corresponding to each frame, etc. Specifically, if each block includes 5 frames, and it is predicted that two activation points that need to be decoded and outputted exist in a certain block, positions of two frames with the largest Attention coefficients in the block can be determined as positions of activation points that need to be decoded and outputted. The decoder can then perform decoding and outputting at the positions of the activation points. As can be seen through the above method, this makes the determination of positions of activation points no longer depend on manually set threshold for Attention coefficient. Rather, the number of activation points predicted in each block can be used as guidance, and positions of one or more frames with the largest Attention coefficients can be set as positions of activation points in the block.

Apparently, in the solutions provided by the embodiments of the present disclosure, there may also be a mismatch between the process of training the prediction module and the process of actually using the prediction module for testing. However, such mismatch only lies in the fact that training can use actual prediction output number information (Cm) in each block, but only predicted outputs of a predictor can be used in actual testing. However, since the accuracy of predicting how many activation points are included in each block is very high, and the accuracy reaches more than 95% in responsible tasks, the mismatch between training and testing is very low, and a significant improvement in the performance as compared to the existing MoCHA solution can be obtained. Moreover, experiments show that performances of the streaming speech recognition solution provided by the embodiments of the present disclosure and the offline speech recognition that is based on a whole-sentence attention mechanism are basically the same.

Figure 2:
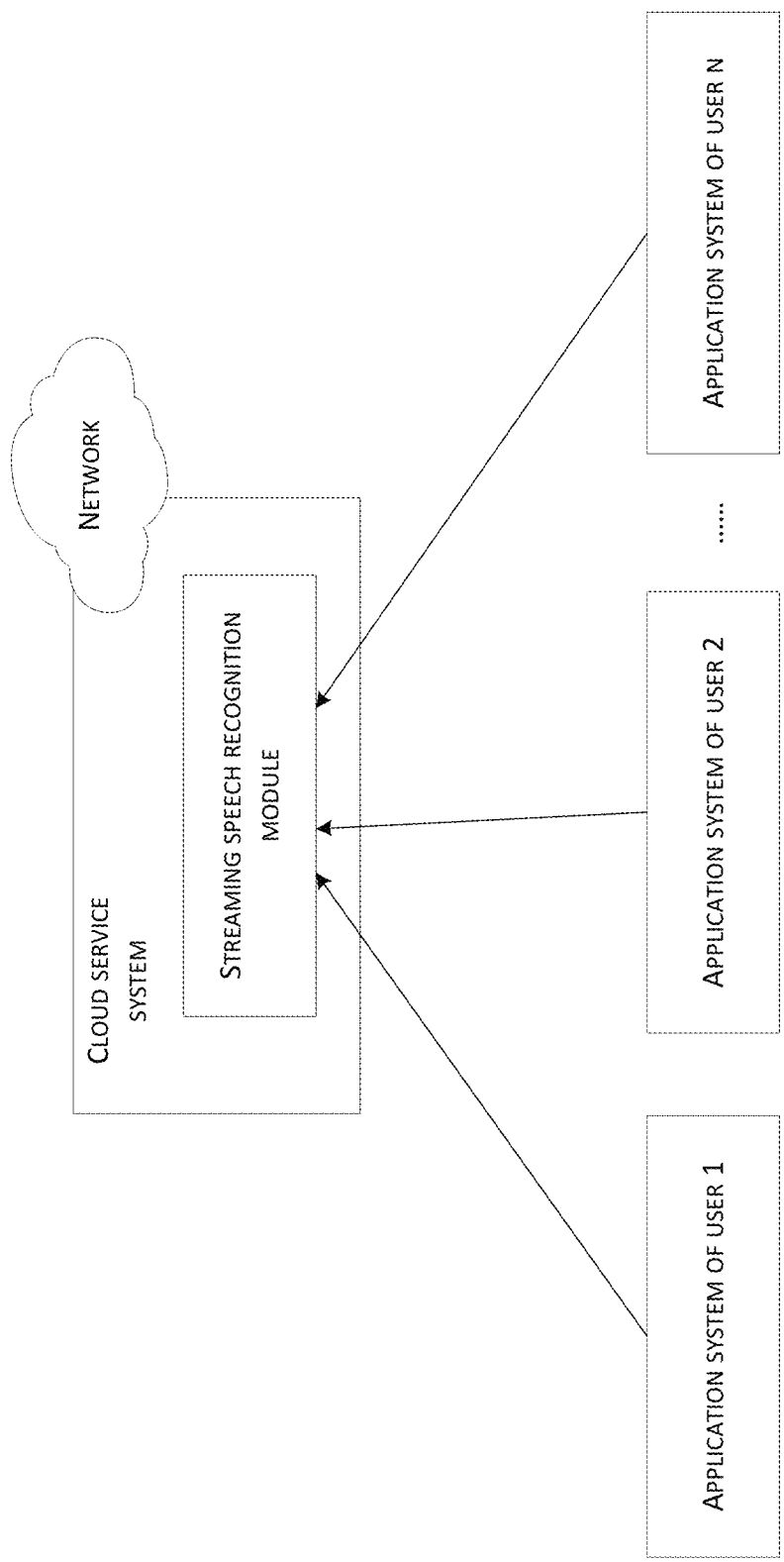
FIG. 2 is a schematic diagram of a system architecture provided by the embodiments of the present disclosure.

In implementations, specific technical solutions provided in the embodiments of the present disclosure can be used in various application scenarios. For example, as shown in FIG. 2, a cloud service system may provide a cloud speech recognition service. If streaming end-to-end speech recognition needs to be implemented in the service, the solutions provided by the embodiments of the present disclosure can be used for implementation. In implementations, the cloud service system can provide a specific predictive model, and provide users with a cloud speech recognition interface. Multiple users can call this interface in their respective application systems. After receiving the calls, the cloud service system can run related processing programs to implement streaming speech recognition and return recognition results. Alternatively, the solutions provided in the embodiments of the present disclosure may also be used for speech recognition in a localized speech recognition system or device, for example, a navigation robot in a shopping mall, a self-service case-filing all-in-one machine in a court, etc.

The technical solutions provided by the embodiments of the present disclosure are described in detail below.

Figure 3:
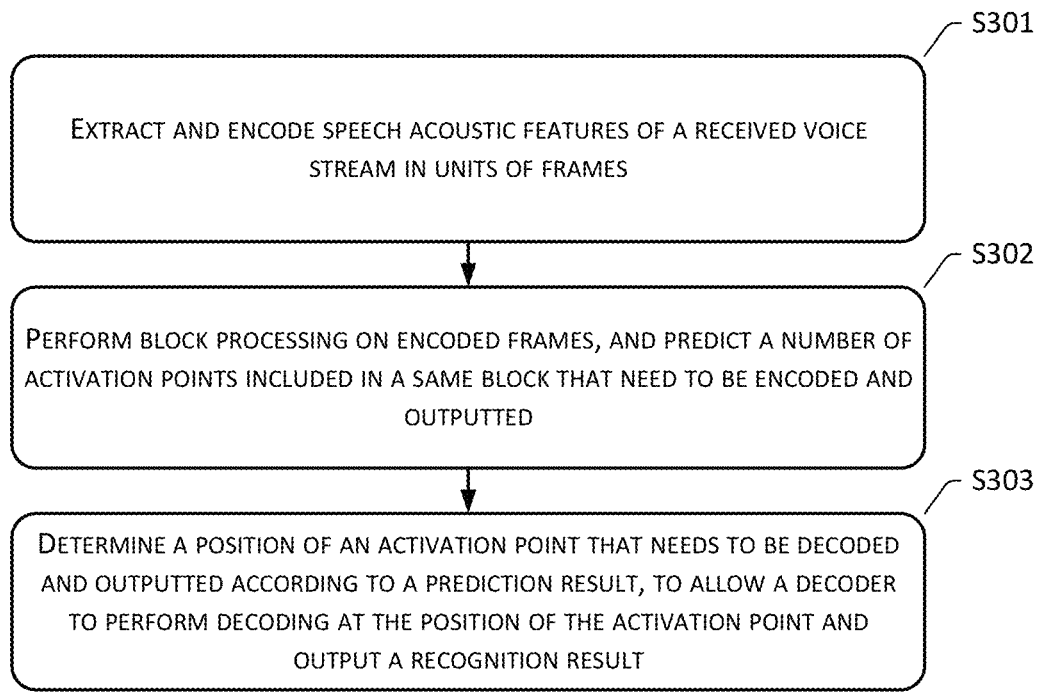
FIG. 3 is a flowchart of a first method provided by the embodiments of the present disclosure.

Referring to see FIG. 3, the present disclosure provides a streaming end-to-end speech recognition method, which includes:

S301: Extract and encode speech acoustic features of a received voice stream in units of frames.

In the process of streaming speech recognition, speech acoustic features can be extracted from a voice stream in units of frames, and encoded in units of frames. An encoder output encoding results corresponding to each frame. Moreover, since the voice stream is continuously inputted, the operation of encoding the voice stream may also be continuously performed. For example, if a frame is of 60 ms, along with the reception of the voice stream, feature extraction and encoding processing are performed on every voice stream of 60 ms as one frame. The purpose of the encoding process is to transform speech acoustic features that are received to obtain a new higher-level representation with more distinguishing features, and the higher-level representation can usually exist in a form of a vector. Therefore, the encoder can be a multi-layer neural network, and there are many choices of neural networks, such as DFSMN, CNN, BLSTM, Transformer, etc.

S302: Perform block processing on encoded frames, and predict a number of activation points included in a same block that need to be encoded and outputted.

In the embodiments of the present disclosure, after an encoding result is obtained, block processing may be performed first, and the number of activation points may be predicted in units of blocks. Since a block may include multiple frames, in implementations, after the encoding of each frame of voice stream is completed, an encoding result may be bufferd first. Every time when the number of frames associated with bufferd encoding results reaches the corresponding number of frames in a block, encoding results of each frame currently bufferd can be determined as a block. A prediction module can predict the number of activation points included in that block that need to be encoded and outputted. For example, every 5 frames correspond to one block. In this case, the encoder may perform prediction processing every time after encoding 5 frames of voice stream is completed. In an optional implementation, after the prediction of a block is completed, encoding results of each frame corresponding to the block may also be deleted from the buffer.

In implementations, encoding results of each frame can usually also be used to calculate Attention coefficients in a specific attention mechanism system, and the Attention coefficients can also be weighted, summed, and then provided to a decoder as an input to the decoder for operation. Therefore, in implementations, in order to avoid data interaction or conflict between the prediction module and the Attention module, the output of the encoder can be provided to the prediction module and the Attention module respectively. The prediction module and the Attention module can correspond to different buffer spaces, and can independently perform processing on decoding result data in their own buffer spaces, such as operations of obtaining respective prediction results of the number of activation points, and calculating the Attention coefficients, etc.

Since a decoding result needs to be divided into blocks, a certain delay may be generated in the process of speech recognition. A specific delay size depends on the size of the block. For example, a block of every 5 frames, a delay time is the time associated with 5 frames, etc. In implementations, the size of the block can be determined according to the delay time that can be tolerated by the system. For example, in extreme cases, each frame can be treated as a block, etc.

Regarding the specific prediction module, it can be implemented by a pre-trained model. In order to complete the training of the model, a training sample set can be prepared, which includes encoding results that correspond to voice streams and are divided into blocks according to a certain size, and the number of activation points included in each block that need to be outputted can be annotated. Specifically, when training a predictive model, sample information and labeling information as mentioned above can be inputted into an initialized model, and model parameters can be gradually optimized through multiple rounds of iterations. The training will end when the algorithm converges. If the specific predictive model is implemented using a deep learning model such as a neural network, etc., a process of adjusting parameters is performed, which may specifically be a process of adjusting weights of each layer in the deep learning model.

After the training of the predictive model is completed, as long as the encoding result contained in the same block is inputted into the predictive model, the predictive model can output information on the number of activation points in the block that need to be decoded and outputted.

It should be noted that, when training the predictive model, the actual prediction output number information (Cm) in each block is used, and only the prediction output of the predictor can be used in actual testing. However, since the accuracy of predicting how many activation points are included in each block can be very high, the mismatch between training and testing will be very low as compared to the MoCHA system, which will not affect the performance of recognition.

In addition, it should be noted that for a voice stream, the average duration of a character in the voice stream is usually about 200 ms, that is, when a user speaks, the pronunciation of each character may last for about 200 ms (apparently, the actual duration may vary from person to person due to the rate of speech). If a frame is of 60 ms, the pronunciation of the same modeling unit (for example, corresponding to a word in Chinese, or a word in English, etc.) may be distributed in multiple consecutive frames. In practice, however, the same modeling unit usually needs to perform decoding and outputting for one of the frames only, and associate that frame with features of surrounding frames. However, in the embodiments of the present disclosure, multiple frames are demarcated as one block. Therefore, there may be a situation that frames where the same modeling unit is located are demarcated into multiple different blocks. Therefore, in order to prevent different frames corresponding to the same modeling unit from being identified as activation points in different blocks, this problem can be taken into account when training the predictive model, that is, there can be training samples corresponding to the above situation and corresponding labeling information. In this way, the trained model can correctly deal with the above-mentioned situations when it is specifically tested.

S303: Determine a position of an activation point that needs to be decoded and outputted according to a prediction result, to allow a decoder to perform decoding at the position of the activation point and output a recognition result.

After predicting the number of activation points that need to be decoded and outputted in each block, a position of an activation point can be further determined, so that a decoder can decode and output a recognition result at the position of the activation point. In implementations, if a block only includes an encoding result corresponding to one frame of voice stream, a prediction result is either 0 or 1 when the number of activation points included in each block is predicted. Therefore, the problem of predicting the number of activation points included in a block has evolved into a problem of predicting whether each block includes activation points that need to be decoded and outputted. In other words, a specific prediction result may be whether a current block includes an activation point that needs to be encoded and outputted. In this case, a position of the block including the activation point may be directly determined as the position of the activation point. For example, specific prediction results may be shown in Table 1:

TABLE 1

| Frame sequence | Block sequence | Prediction result of the number of activation points | Whether it is the position of the activation point |
| --- | --- | --- | --- |
| 0 | 0 | 0 | No |
| 1 | 1 | 0 | No |
| 2 | 2 | 0 | No |
| 3 | 3 | 1 | Yes |
| 4 | 4 | 0 | No |
| ... | ... | ... | ... |

As can be seen, when block division is performed in units of frames, after predicting the number of activation points is completed for a block, a position of a specific activation point can be directly determined. Alternatively, in another way, the Attention coefficient can also reflect whether a certain frame is an activation point to a certain extent, or the probability that a certain frame belongs to an activation point, in the specific implementations, the Attention coefficient of each frame's encoding result can also be determined respectively. The Attention coefficient is used to describe the probability that the corresponding frame needs to be decoded and outputted. Then, an associated prediction result can be verified according to the Attention coefficient. For example, in implementations, a threshold for the Attention coefficient can be preset. If a prediction result of a block where a certain frame is located indicates that the frame belongs to an activation point, and the Attention coefficient of that frame is also greater than the threshold, the number of frames and the probability of activation point, etc., can be further increased. Conversely, if a prediction result of a block shows that a frame belongs to an activation point, but the calculated Attention coefficient is very low, the prediction module can also perform re-prediction by adjusting the strategy, such as using features of a greater number of surrounding frames for prediction, etc. Apparently, in this method, the threshold of the Attention coefficient is still used. However, since it is only used to verify a prediction result of a block, it has little impact on the performance of the entire system.

In another method, a same block may include encoding results corresponding to multiple frames of a voice stream. At this time, the prediction module can only predict several activation points that are included in the same block, but cannot directly determine which frames of the block the activation points are in. Therefore, in implementations, positions of the activation points can also be determined in combination with Attention coefficients of each frame. Specifically, firstly, attention coefficients of encoding results of each frame can be determined respectively. Then, according to the number of activation points included in the block, positions of frames associated with a corresponding number of the first few highest Attention coefficients among the encoding results of each frame included in the block may be determined as positions of activation points. In other words, if a block is predicted to include two activation points, positions of frames associated with the first two highest Attention coefficients in each frame included in the block can be determined as positions of the two activation points. For example, in one example, specifics of prediction results for the number of activation points, situations about Attention coefficients, and determined position information of the activation points can be shown in Table 2:

TABLE 2

| Frame sequence | Block sequence | Number of activation points predicted in a block | Attention coefficient of corresponding frame | Whether corresponding frame belongs to activation point |
|---|---|---|---|---|
| 0 | 0 | 1 | 0.01 | No |
| 1 |   |   | 0.22 | No |
| 2 |   |   | 0.78 | No |
| 3 |   |   | 0.95 | Yes |
| 4 |   |   | 0.75 | No |
| 5 | 1 | 2 | 0.63 | No |
| 6 |   |   | 0.88 | Yes |
| 7 |   |   | 0.72 | No |
| 8 |   |   | 0.58 | No |
| 9 |   |   | 0.93 | Yes |
| ... | ... | ... | ... | ... |

In the above table, every 5 frames is demarcated as one block, and therefore the 0th to 4th frames are demarcated as a block, the 5th to 9th frames are demarcated as a block, and so on. If the prediction module predicts that the first block contains 1 activation point, and calculates that the Attention coefficients of the 0th to 4th frames are 0.01, 0.22, 0.78, 0.95, 0.75 respectively, the position of the frame associated with the highest Attention coefficient among the above 0th to 4th frames can be determined as the position of the activation point in this case. In other words, the position of the third frame is the activation point, and the other frames in this block do not belong to the activation point and do not need to be decoded and outputted. Similarly, if the prediction module predicts that the second block includes 2 activation points, and calculates that Attention coefficients of the 4th to 9th frames are 0.63, 0.88, 0.72, 0.58, and 0.93 respectively, the positions of the two frames associated with the first two highest Attention coefficients among the above 5th to 9th frames are determined as the positions of the activation points in this case. In other words, the positions of the 6th and 9th frames are the activation points, and the other frames in the block do not belong to activation points and do not need to be decoded and outputted.

As can be seen through the method described in the embodiments of the present disclosure, when determining a position of an activation point, it is not necessary to compare the Attention coefficient with a preset threshold. Rather, when predicting that a number of activation points exist in a block, attention coefficients associated with frames included in the block are compared with one another, and a corresponding number of frames associated with the larger Attention coefficients are taken as the positions of the activation points. In this way, since both training and testing can be performed universally according to the manner as described above, the degree of matching between training and testing can be improved, and the impact on system performance can be reduced. In addition, since the specific comparison operation of Attention coefficients can be performed in the same block, and thus is not affected by future frames. Therefore, the accuracy of the positions of activation points that is determined is also higher.

It should be noted that, in implementations, the size of a block may be preset, or an initial value may also be preset, and may be dynamically adjusted according to an actual voice stream during testing. Specifically, as mentioned above, due to different speech rates, the number of modeling units (the number of Chinese characters, etc.) and the densities of inputs within the same length of time may be different for different users. Accordingly, in implementations, the size of the block may be adaptively adjusted according to the predicted frequency of occurrence of activation points. For example, if the frequency of activation points is found to be high during a certain prediction process, the size of a block can be reduced to shorten the delay, and conversely, the size of a block can be increased, so that the delay of recognition of the system can change with the speech rate of the input person.

In short, through the embodiments of the present disclosure, during a process of identifying a voice stream, encoded frames can be divided into blocks, and respective numbers of activation points included in the blocks that need to be decoded and outputted can be predicted. In this way, specific position(s) of activation point(s) in a specific block can be determined according to a prediction result, so as to instruct a decoder to decode and output a recognition result at the corresponding position(s) of the activation point(s). In this way, as it is no longer necessary to compare Attention coefficients with a threshold to determine positions of activation points, and it will not be affected by future frames, the accuracy can be improved. In addition, since the process of predicting the number of activation points included in a block is easier to obtain a higher accuracy, the mismatch between training and prediction will be lower, thus improving the robustness of the streaming end-to-end speech recognition system to noise, and having a relatively small impact on the performance of the system.

Figure 4:
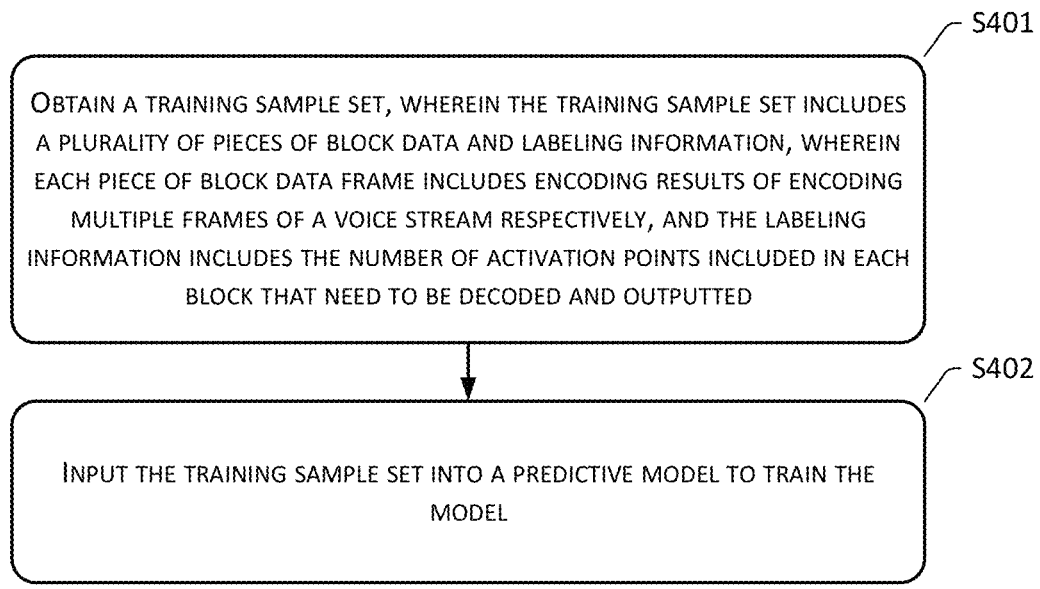
FIG. 4 is a flowchart of a second method provided by the embodiments of the present disclosure.

The present disclosure provides a method for building a predictive model. Referring to FIG. 4, the method may specifically include:

S401: Obtain a training sample set, wherein the training sample set includes a plurality of pieces of block data and labeling information, wherein each piece of block data frame includes encoding results of encoding multiple frames of a voice stream respectively, and the labeling information includes the number of activation points included in each block that need to be decoded and outputted.

S402: Input the training sample set into a predictive model to train the model.

In implementations, the training sample set may include a situation in which multiple frames of voice streams corresponding to a same modeling unit are divided into different blocks, so that a modeling unit such as a same text can be divided into multiple different blocks are trained to obtain accurate predictions when the same situation is encountered during testing.

Figure 5:
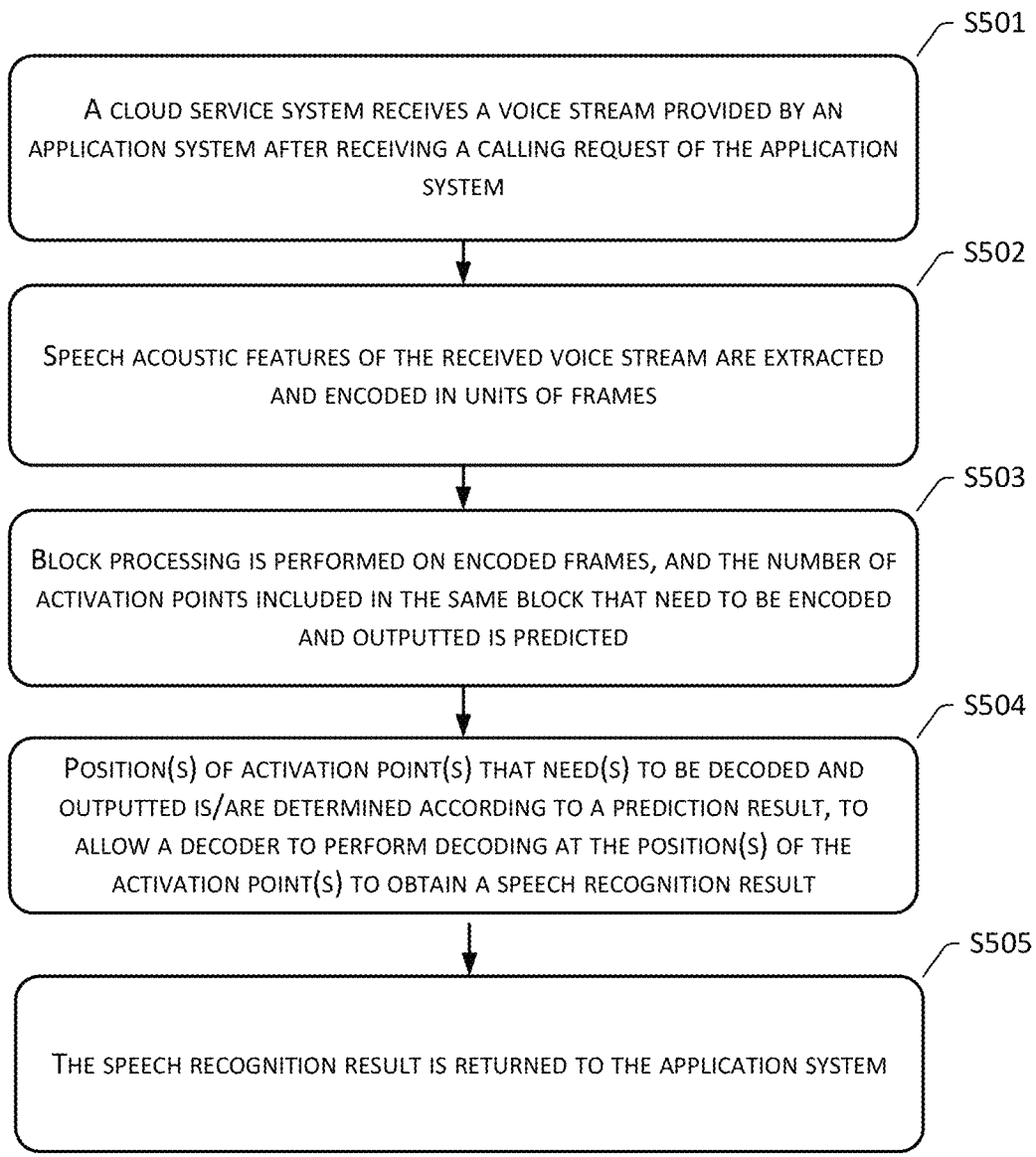
FIG. 5 is a flowchart of a third method provided by the embodiments of the present disclosure.

The present disclosure is introduced for a scenario when the solutions provided by the embodiments of the present disclosure are applied in a cloud service system. In implementations, the present disclosure first provides a method for providing a speech recognition service from the perspective of a cloud server, Referring to FIG. 5, the method may specifically include:

S501: A cloud service system receives a voice stream provided by an application system after receiving a calling request of the application system.

S502: Speech acoustic features of the received voice stream are extracted and encoded in units of frames.

S503: Block processing is performed on encoded frames, and the number of activation points included in the same block that need to be encoded and outputted is predicted.

S504: Position(s) of activation point(s) that need(s) to be decoded and outputted is/are determined according to a prediction result, to allow a decoder to perform decoding at the position(s) of the activation point(s) to obtain a speech recognition result.

S505: The speech recognition result is returned to the application system.

Figure 6:
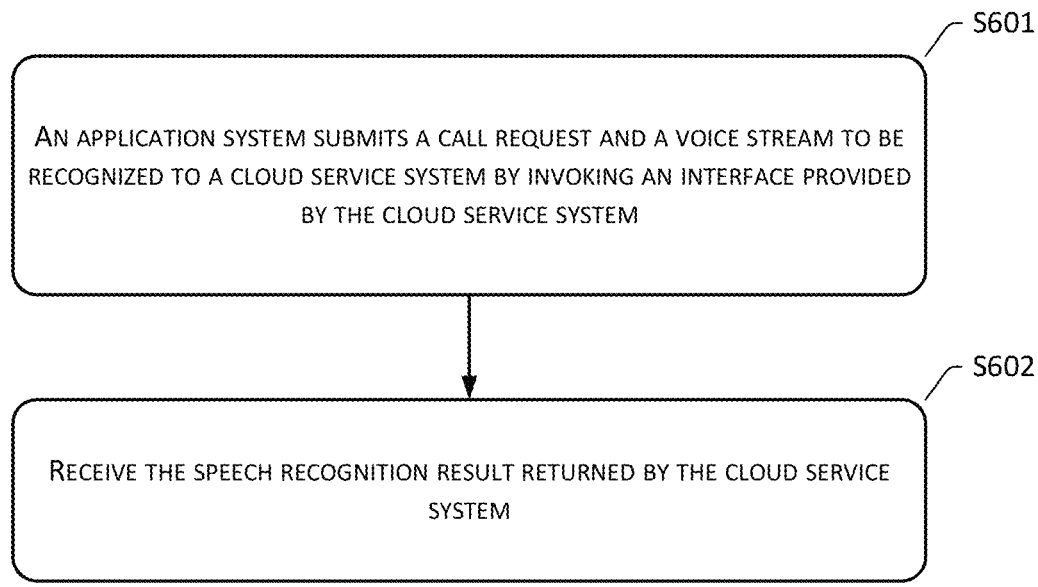
FIG. 6 is a flowchart of a fourth method provided by the embodiments of the present disclosure.

From the perspective of an application system, a method for obtaining speech recognition information is provided. In implementations, this method corresponds to the foregoing method as described above and shown in FIG. 5. Referring to FIG. 6, the method may specifically include:

S601: An application system submits a call request and a voice stream to be recognized to a cloud service system by invoking an interface provided by the cloud service system, and the cloud service system performs extracts and encodes speech acoustic feature of the received voice stream in units of frames, performs block processing on encoded frames, and predict the number of activation points included in a same block that need to be encoded and outputted; and after determining positions of activation points to be decoded and outputted according to a prediction result, obtains a speech recognition result by performing decoding at the positions where the activation points are located by a decoder.

S602: Receive the speech recognition result returned by the cloud service system.

Figure 7:
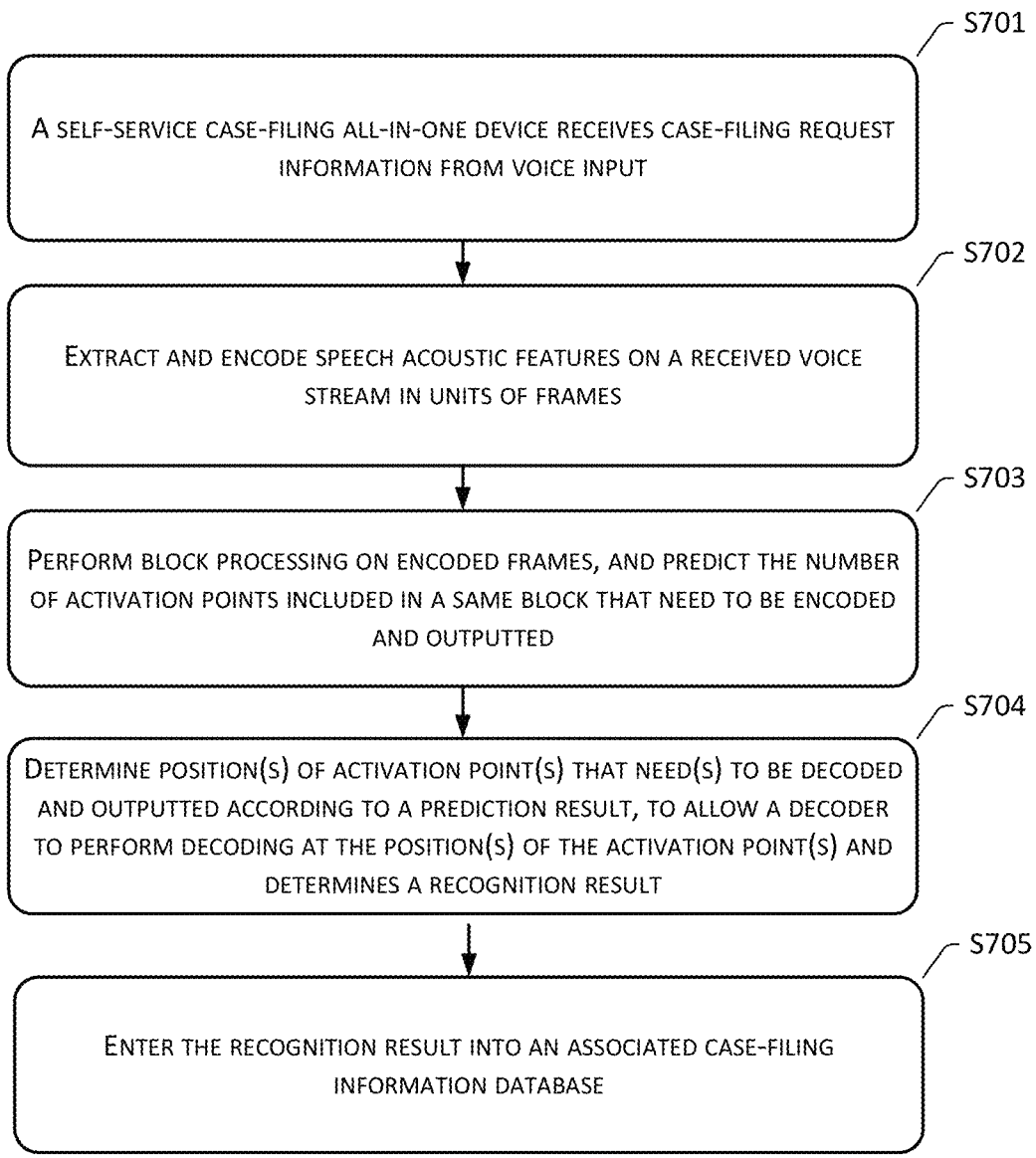
FIG. 7 is a flowchart of a fifth method provided by the embodiments of the present disclosure.

In implementations, the following describes an application scenario of the solutions provided by the embodiments of the present disclosure in a self-service case-filing all-in-one machine of a court. In implementations, referring to FIG. 7, the present disclosure provides a method for implementing court's self-service case-filing. The method may include:

S701: A self-service case-filing all-in-one device receives case-filing request information from voice input.

S702: Extract and encode speech acoustic features on a received voice stream in units of frames.

S703: Perform block processing on encoded frames, and predict the number of activation points included in a same block that need to be encoded and outputted.

S704: Determine position(s) of activation point(s) that need(s) to be decoded and outputted according to a prediction result, to allow a decoder to perform decoding at the position(s) of the activation point(s) and determines a recognition result.

S705: Enter the recognition result into an associated case-filing information database.

The foregoing embodiments introduce the streaming speech recognition methods provided by the embodiments of the present disclosure and their applications in specific scenarios. In implementations, for application scenarios in hardware devices such as smart speakers, the functions provided by the embodiments of the present disclosure may not be implemented when users purchase specific hardware devices, and so relatively "old" hardware devices can only use traditional methods to perform speech recognition. In the embodiments of the present disclosure, in order to enable these "old" hardware devices to perform streaming speech recognition in a new way, so as to improve the user experience, an upgrade solution may be provided for terminal devices. For example, in implementations, a specific process of stream speech recognition processing may be provided on a server, and a specific hardware device only needs to submit a collected user voice stream to the server. In this case, models and the like that are needed in the specific process of speech recognition only need to be saved in the server, and the terminal device usually does not need to improve its hardware in order to realize an upgrade. Apparently, in the process of streaming speech recognition, it usually involves collection of user data and submission thereof to the server. Therefore, in implementations, the server can first push a recommendation of capability of performing an upgrade to the hardware device. If the user needs to upgrade the device, the user can express his/her needs through voice input or other means. After that, a specific upgrade request can be submitted to the server, which will process the upgrade request. In implementations, the server can also determine a status of the hardware device, for example, whether the associated user has paid corresponding resources to obtain the upgraded service, etc., and if so, can give it the permission to perform streaming speech recognition in an upgraded manner. In this way, the hardware device can perform streaming speech recognition in the manner provided by the embodiments of the present disclosure during subsequent dialogue with the user. Specifically, streaming speech recognition functions can be completed by the server. Alternatively, if the hardware resources of the hardware device itself are able to support, an upgraded recognition model can also be pushed directly to the hardware device and the hardware device can locally complete streaming speech recognition, for example.

In addition, for cases in which the model is stored in the server, a "switch" function can also be provided, so that the user can use the above function only when necessary, so as to achieve purposes such as saving resources, etc. For example, when the user only needs to use it in a home scenario, since the requirement for the accuracy of speech recognition is not high, a request can be submitted to close the above-mentioned advanced function (that is, the recognition methods provided by the embodiments of the present disclosure) through a voice command or the like. After that, the server can temporarily disable this function for the user, and can further trigger to stop billing if billing is involved, for example. The hardware device could fall back to the original way of performing streaming speech recognition. It may even be acceptable to wait until the user has finished speaking a complete sentence and then perform recognition. Subsequently, if the user needs to use the hardware device in a work scenario, the advanced function provided in the embodiments of the present disclosure may be re-enabled, for example.

Figure 8:
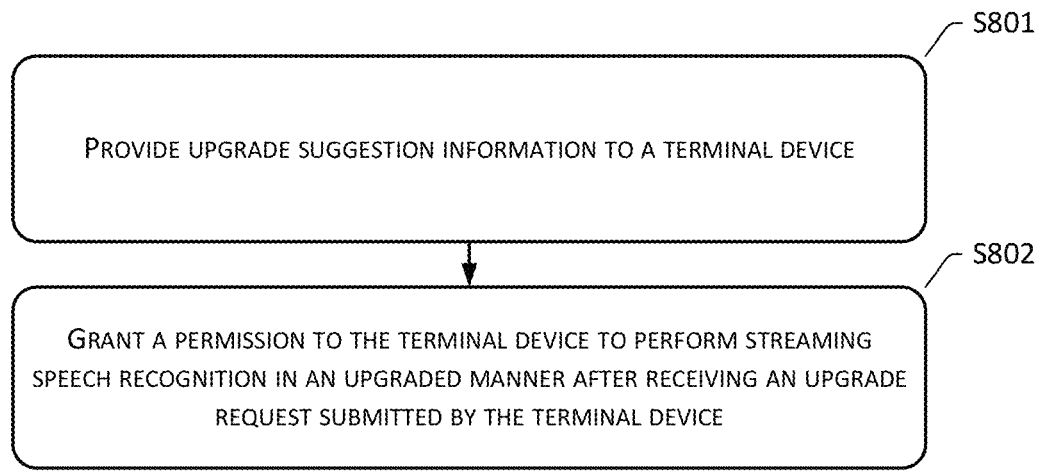
FIG. 8 is a flowchart of a sixth method provided by the embodiments of the present disclosure.

In implementations, the present disclosure provides a method for a device upgrade. Referring to FIG. 8, the method may specifically include:

S801: Provide upgrade suggestion information to a terminal device.

S802: Grant a permission to the terminal device to perform streaming speech recognition in an upgraded manner after receiving an upgrade request submitted by the terminal device, wherein performing the streaming speech recognition in the upgraded manner includes: extracting and encoding speech acoustic features of a received voice stream, performing block processing on encoded frames, and predicting a number of activation points included in a same block that need to be encoded and outputted; and after determining position(s) of activation point(s) that need(s) to be decoded and outputted, performing decoding at the position(s) of the activation point(s) to obtain a speech recognition result.

The terminal device may specifically include a smart speaker device, etc.

In implementations, the permission to perform the streaming speech recognition in the upgraded manner may also be disabled for the terminal device according to a downgrade request submitted by the terminal device.

For the parts not described in detail in the foregoing embodiments, reference may be made to the description of the embodiments described above and shown in FIG. 3, and details thereof are not repeated herein.

It should be noted that the embodiments of the present disclosure may involve the use of user data. In practical applications, when the applicable laws and regulations of the host country (for example, the user expressly agrees, and etc.) are fulfilled, user-specific personal data in the scenarios described herein can be used within the scope permitted by the applicable laws and regulations.

Figure 9:
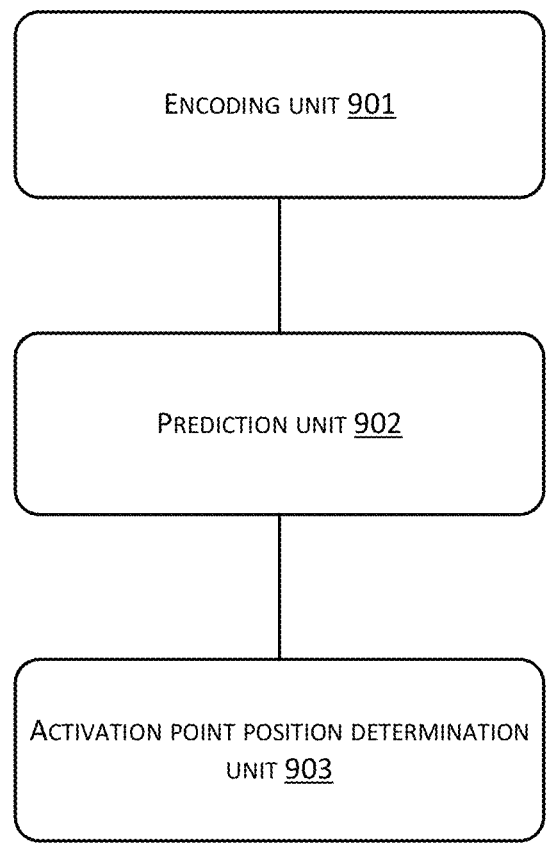
FIG. 9 is a schematic diagram of a first apparatus provided by the embodiments of the present disclosure.

Corresponding to the embodiments described above and shown in FIG. 3, the embodiments of the present disclosure further provides a streaming end-to-end speech recognition apparatus. Referring to FIG. 9, the apparatus may specifically include:

an encoding unit 901 configured to extract and encode speech acoustic features of a received voice stream in units of frames;

a prediction unit 902 configured to perform block processing on encoded frames, and predict a number of activation points included in a same block that need to be encoded and outputted; and an activation point position determination unit 903 configured to determine position(s) of the activation point (s) that need(s) to be decoded and outputted according to a prediction result, to allow a decoder to perform decoding at the position(s) of the activation point(s) and output a recognition result.

An encoding result corresponding to a frame of the voice stream is included in the block.

The prediction result includes: whether a current block includes an activation point that needs to be encoded and outputted The activation point position determination unit can be specifically configured to:

determine position(s) of block(s) including the activation point(s) as the position(s) of the activation point(s).

In this case, the apparatus may also include:

an attention coefficient determination unit configured to determine Attention coefficients of encoding results of each frame respectively, the Attention coefficients being used to describe probabilities that corresponding frames need to be decoded and outputted; and a verification unit configured to verify the prediction result based on the Attention coefficients.

Alternatively, encoding results corresponding to a multi-frame voice stream are included in the block.

In this case, the apparatus may also include:

an attention determination unit configured to determine Attention coefficients of encoding results of each frame respectively, the Attention coefficients being used to describe probabilities that corresponding frames need to be decoded and outputted.

The activation point position determination unit can be specifically configured to:

compare the Attention coefficients of each frame in a same block and sort the Attention coefficients in order of magnitudes; and determining positions of frames associated with a corresponding number of first few highest Attention coefficients among encoding results of each frame included in the block as the position(s) of the activation point(s) according to a number of activation points included in the block.

In this case, the apparatus may also include:

a block adjustment unit configured adaptively adjust a block size according to a frequency of occurrence of predicted activation points.

The prediction unit may specifically include:

a buffering subunit configured to buffer the encoding results; and a block determination subunit configured to determine encoding results of various frames currently buffered as a block when a number of frames associated with encoding results added to a buffer reaches the block size.

In implementations, the apparatus may also include:

deleting the encoding results of each frame of the block from the buffer after prediction processing of the block is completed.

Figure 10:
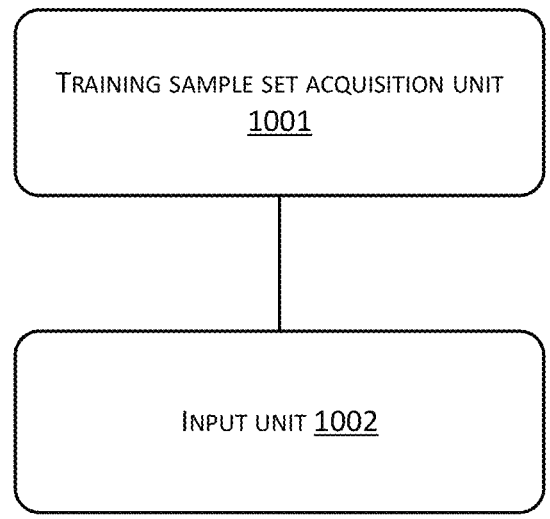
FIG. 10 is a schematic diagram of a second apparatus provided by the embodiments of the present disclosure.

Corresponding to the embodiments described above and shown in FIG. 4, the embodiments of the present disclosure also provides an apparatus for building a predictive model. Referring to FIG. 10, the apparatus includes:

a training sample set acquisition unit 1001 configured to obtain a training sample set, the training sample set including a plurality of block data and labeling information, wherein each block data frame includes an encoding result of respectively encoding a plurality of frames of a voice stream, and the labeling information includes a number of activation points included in each block that need to be decoded and outputted; and an input unit 1002 configured to input the training sample set into a predictive model for model training.

The training sample set includes a situation in which multiple frames of the voice stream that correspond to a same modeling unit are divided into different blocks.

Figure 11:
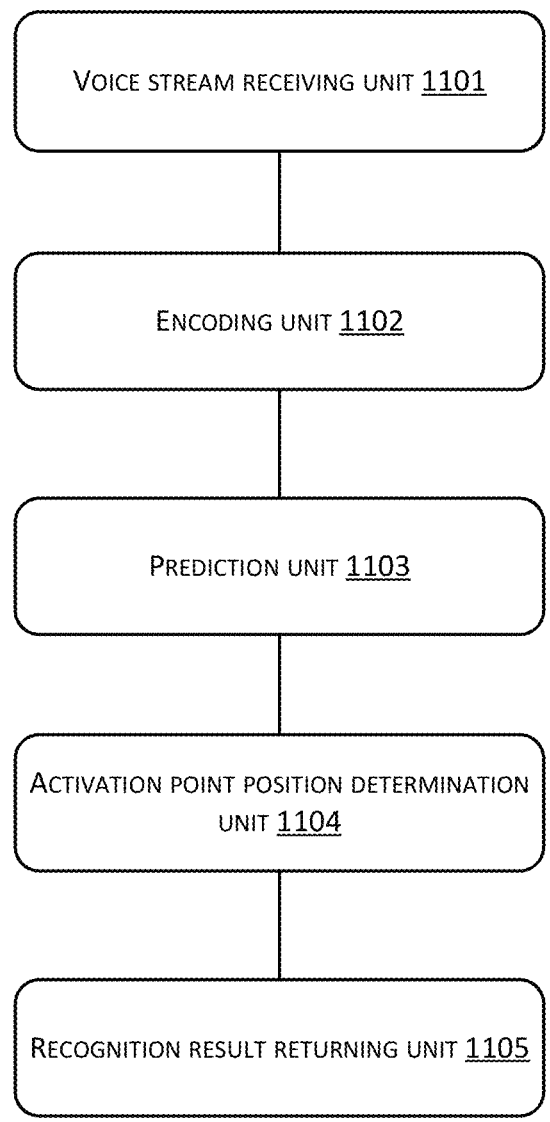
FIG. 11 is a schematic diagram of a third apparatus provided by the embodiments of the present disclosure.

Corresponding to the embodiments described above and shown in FIG. 5, the embodiments of the present disclosure also provide an apparatus for providing a speech recognition service. Referring to FIG. 11, the apparatus is applied in a cloud service system, and includes:

a voice stream receiving unit 1101 configured to receive a voice stream provided by an application system after receiving a calling request from the application system;

an encoding unit 1102 configured to extract and encode speech acoustic features of a received voice stream in units of frames;

a prediction unit 1103 configured to perform block processing on encoded frames, and predict a number of activation points included in a same block that need to be encoded and outputted;

an activation point position determination unit 1104 configured to determine a position of an activation point that needs to be decoded and outputted according to a prediction result, to allow a decoder to perform decoding at the position of the activation point to obtain a speech recognition result; and a recognition result returning unit 1105 configured to return the speech recognition result to the application system.

Figure 12:
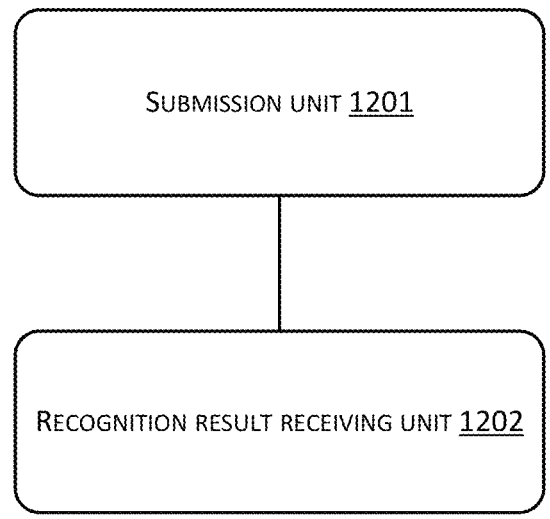
FIG. 12 is a schematic diagram of a fourth apparatus provided by the embodiments of the present disclosure.

Corresponding to the embodiments described above and shown in FIG. 6, the embodiments of the present disclosure also provide an apparatus for obtaining speech recognition information. Referring to FIG. 12, the apparatus is applied in an application system, and includes:

a submission unit 1201 configured to submit a call request and a voice stream to be recognized to a cloud service system by invoking an interface provided by the cloud service system, the cloud service system extracting speech acoustic features of the received voice stream in units of frames and performing encoding, performing block processing on encoded frames, predicting a number of activation points included in a same block that need to be encoded and outputted, and performing decoding at the position of the activation point to obtain a speech recognition result after determining a position of an activation point that needs to be decoded and outputted according to a prediction result; and a recognition result receiving unit 1202 configured to receive the speech recognition result returned by the cloud service system.

Figure 13:
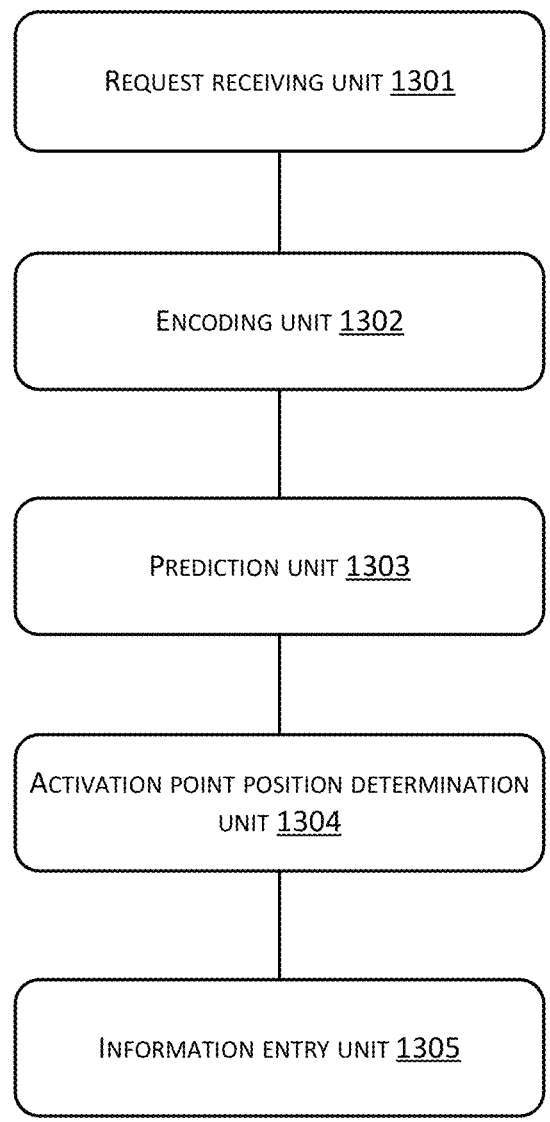
FIG. 13 is a schematic diagram of a fifth apparatus provided by the embodiments of the present disclosure.

Corresponding to the embodiments described above and shown in FIG. 7, the embodiments of the present disclosure also provide an apparatus for implementing court self-service case filing. Referring to FIG. 13, the apparatus is applied in a self-service case-filing all-in-one machine, and includes:

a request receiving unit 1301 configured to receive case filing request information through voice input;

an encoding unit 1302 configured is used to extract and encode speech acoustic features of a received voice stream in units of frames;

a prediction unit 1303 configured to perform block processing on encoded frames, and predict a number of activation points included in a same block that need to be encoded and outputted;

an activation point position determination unit 1304 configured to determine a position of an activation point that needs to be decoded and outputted according to a prediction result, to allow a decoder to perform decoding at the position of the activation point and determine a recognition result; and an information entry unit 1305 configured to enter the recognition result into an associated case-filing information database.

Figure 14:
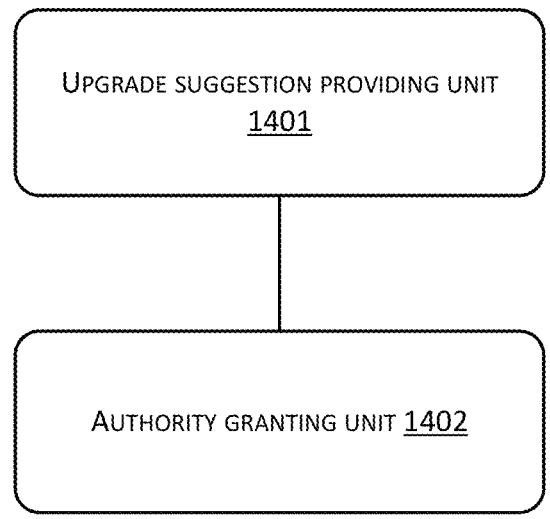
FIG. 14 is a schematic diagram of a sixth apparatus provided by the embodiments of the present disclosure.

Corresponding to the embodiments described above and shown in FIG. 8, the embodiments of the present disclosure further provide an apparatus for upgrading a terminal device. Referring to FIG. 14, the apparatus may include:

an upgrade suggestion providing unit 1401 configured to provide upgrade advice information to a terminal device; and an authority granting unit 1402 configured to grant the terminal device a permission to perform streaming speech recognition in an upgraded manner after receiving an upgrade request submitted by the terminal device, performing the streaming speech recognition in the upgraded manner including: extracting and encoding speech acoustic features of a voice stream in units of frames, performing block processing on encoded frames, and predicting a number of activation points included in a same block that need to be encoded and outputted; and obtaining a speech recognition result by performing decoding at a position of an activation point through a decoder after determining the position of the activation point based on a prediction result.

In addition, the embodiments of the present disclosure further provide a computer-readable storage medium in which a computer program is stored, and the program, when executed by a processor, implements the steps of any one of the methods of the foregoing method embodiments.

An electronic device includes:

one or more processors; and memory associated with the one or more processors, the memory being configured to store program instructions that, when read and executed by the one or more processors, perform the steps of any one of the methods of the foregoing method embodiments.

Figure 15:
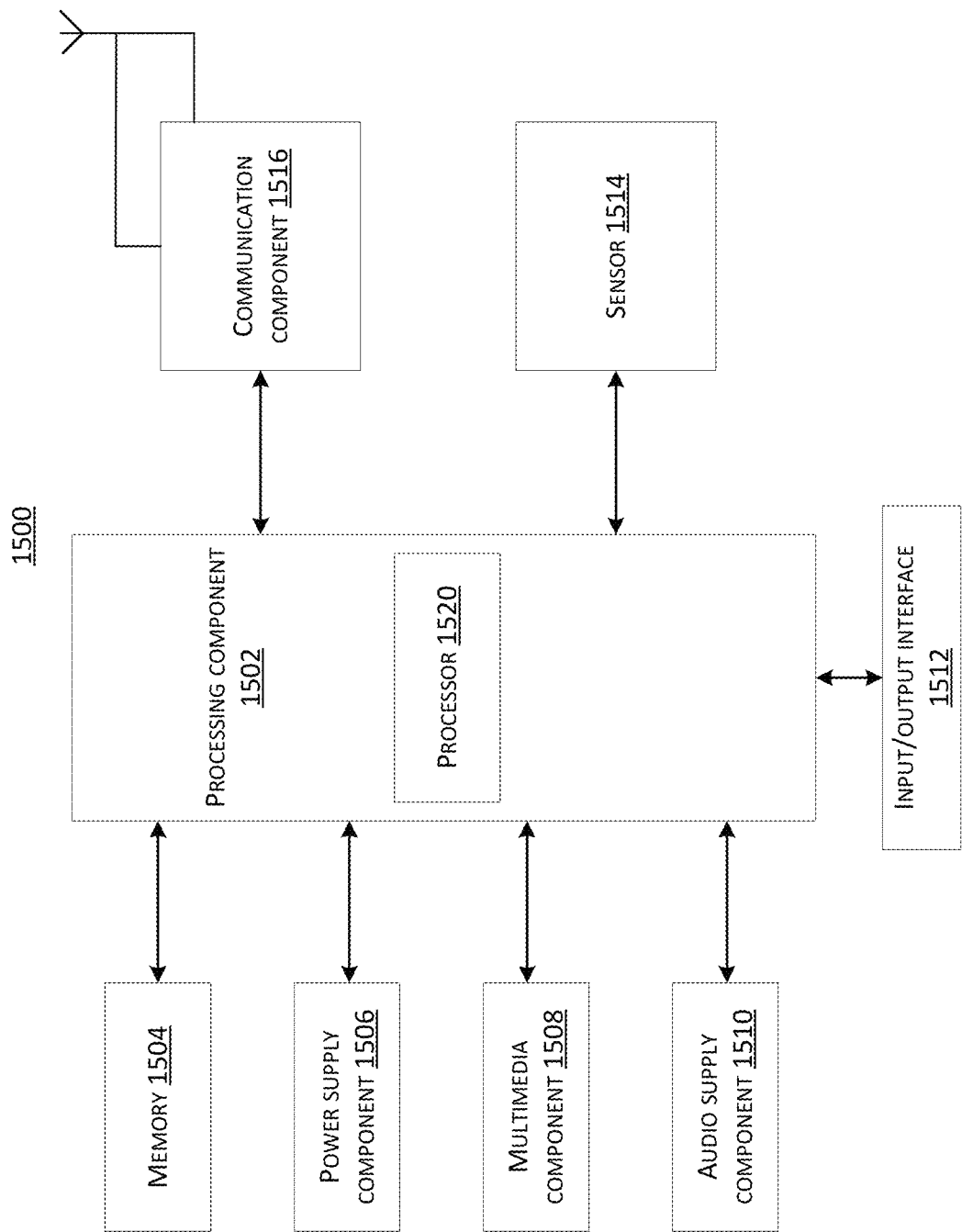
FIG. 15 is a schematic diagram of an electronic device provided by the embodiments of the present disclosure.

FIG. 15 exemplarily shows the architecture of an electronic device. For example, the device 1500 may be a mobile phone, a computer, a digital broadcasting terminal, a messaging device, a game console, a tablet device, a medical device, a fitness device, a personal digital assistant, a flight vehicle, etc.

Referring FIG. 15, a device 1500 may include one or more of the following components: a processing component 1502, a memory 1504, a power supply component 1506, a multimedia component 1508, an audio component 1510, an input/output (I/O) interface 1512, a sensor component 1514, and communication component 1516.

The processing component 1502 generally controls overall operations of the device 1500, such as operations associated with display, phone calls, data communications, camera operations, and recording operations. The processing component 1502 may include one or more processors 1520 to execute instructions to complete all or part of the steps of the methods provided by the technical solutions of the present disclosure. Additionally, the processing component 1502 may include one or more modules that facilitate interactions between the processing component 1502 and other components. For example, the processing component 1502 may include a multimedia module to facilitate interactions between the multimedia component 1508 and the processing component 1502.

The memory 1504 is configured to store various types of data to support operations at device 1500. Examples of such data include instructions for any application programs or methods operating on the device 1500, contact data, phonebook data, messages, pictures, videos, and the like. The memory 1504 may be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, a magnetic disk, or an optical disk.

The memory 1504 may include a form of computer readable media such as a volatile memory, a random access memory (RAM) and/or a non-volatile memory, for example, a read-only memory (ROM) or a flash RAM. The memory 1504 is an example of a computer readable media.

The computer readable media may include a volatile or non-volatile type, a removable or non-removable media, which may achieve storage of information using any method or technology. The information may include a computer readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

The power supply component 1506 provides power to various components of the device 1500. The power supply component 1506 may include a power management system, one or more power supplies, and other components associated with generating, managing, and distributing power to the device 1500.

The multimedia component 1508 includes a screen that provides an output interface between the device 1500 and a user. In some embodiments, the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. A touch sensor can sense not only the boundary of a touch or swipe action, but also the duration and pressure associated with the touch or swipe action. In some embodiments, the multimedia component 1508 includes a front-facing camera and/or a rear-facing camera. When the device 1500 is in an operation mode, such as a shooting mode or a video mode, the front-facing camera and/or the rear-facing camera may receive external multimedia data. Each of the front-facing camera and the rear-facing camera can be a fixed optical lens system or have focal length and optical zooming capabilities.

The audio component 1510 is configured to output and/or input audio signals. For example, the audio component 1510 includes a microphone (MIC) that is configured to receive external audio signals when the device 1500 is in an operating mode, such as a call mode, recording mode, and a voice recognition mode. The received audio signal may be further stored in the memory 1504 or transmitted via the communication component 1516. In some embodiments, the audio component 1510 also includes a speaker for outputting audio signals.

The I/O interface 1512 provides an interface between the processing component 1502 and a peripheral interface module. The peripheral interface module may be a keyboard, a click wheel, buttons, or the like. These buttons may include, but are not limited to: a home button, a volume button, a start button, and a lock button.

The sensor component 1514 includes one or more sensors for providing status assessment of various aspects of the device 1500. For example, the sensor component 1514 can detect an open/closed state of the device 1500, relative positioning of components, such as the display and keypad of the device 1500. The sensor component 1514 may also detect a change in the position of the device 1500 or a component of the device 1500, the presence or absence of user contact with the device 1500, 1500 orientation or acceleration/deceleration of the device, and the temperature change of the device 1500. The sensor component 1514 may include a proximity sensor configured to detect the presence of nearby objects in the absence of any physical contact. The sensor component 1514 may also include a light sensor, such as a CMOS or CCD image sensor, for use in imaging applications. In some embodiments, the sensor component 1514 may also include an acceleration sensor, a gyroscope sensor, a magnetic sensor, a pressure sensor, or a temperature sensor.

The communication component 1516 is configured to facilitate wired or wireless communication between the device 1500 and other devices. The device 1500 can access a wireless network based on a communication standard, such as WiFi, or a mobile communication network such as 2G, 3G, 4G/LTE, and 5G. In an exemplary embodiment, the communication component 1516 receives broadcast signals or broadcast related information from an external broadcast management system via a broadcast channel. In an exemplary embodiment, the communication component 1516 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In the embodiments of the present disclosure, the device 1500 may be implemented by one or more application specific integrated circuits (ASICs), digital signal processors (DSPs), digital signal processing devices (DSPDs), programmable logic devices (PLDs), field programmable gate array (FPGA), controllers, microcontrollers, microprocessors or other electronic components, and used for performing the above methods.

In the embodiments of the present disclosure, the apparatuses described in the foregoing description and shown in FIGS. 9-14, for example, may include one or more electronic devices 1500, or one or more components of the electronic device 1500.

In the embodiments of the present disclosure, a non-transitory computer-readable storage medium including instructions is also provided, such as the memory 1504 including instructions. Such instructions can be executed by the processor 1520 of the device 1500 to complete the methods provided by the technical solutions of the present disclosure. For example, the non-transitory computer-readable storage medium may be ROM, random access memory (RAM), CD-ROM, a magnetic tape, a floppy disk, an optical data storage device, and the like.

From the description of the above embodiments, one skilled in the art can clearly understand that the present disclosure can be implemented by means of software plus a necessary general hardware platform. Based on this understanding, the essence of the technical solutions of the present disclosure or the parts that make contributions to existing technologies can be embodied in a form of a software product. Such computer software product can be stored in a storage medium, such as ROM/RAM, a magnetic disk, CD-ROM, etc., which includes a number of instructions to cause a computing device (which may be a personal computer, a server, or a network device, etc.) to execute the methods described in various embodiments or some parts of the embodiments of the present disclosure.

The various embodiments in this specification are described in a progressive manner. The same and similar parts between the various embodiments may be referenced to each other, and each embodiment focuses on aspects that are different from those of the other embodiments. In particular, for systems or system embodiments, since they are basically similar to the method embodiments, descriptions thereof are relatively simple, and reference may be made to the relevant descriptions of the method embodiments. The systems and system embodiments described above are only illustrative, wherein the units that are described as separate components may or may not be physically separated. The components shown as units may or may not be physical units, that is, can be located in one place, or can be distributed over multiple network elements. Some or all of the modules may be selected according to actual needs to achieve the purposes of the solutions in the embodiments of the present disclosure. One of ordinary skill in the art can understand and implement them without making any creative effort.

The streaming end-to-end speech recognition methods, apparatuses, and electronic devices provided by the present disclosure have been described in detail above. The principles and implementations of the present disclosure are described with specific examples. The descriptions of the above embodiments are used for only helping to understand the methods and the core ideas of the present disclosure. At the same time, for one skilled in the art, based on the ideas of the present disclosure, there can be changes in implementations and application scopes. In conclusion, the content of this specification should not be construed as a limitation on the present disclosure.

The present disclosure can further be understood using the following clauses.

Clause 1: A streaming end-to-end speech recognition method, comprising: extracting and encoding speech acoustic features of a received voice stream in units of frames; performing block processing on encoded frames, and predicting a number of activation points included in a same block that need to be encoded and outputted; and determining position(s) of activation point(s) that need(s) to be decoded and outputted according to a prediction result, to allow a decoder to perform decoding at the position(s) of the activation point(s) and output a recognition result.

Clause 2: The method of Clause 1, wherein: the block includes an encoding result corresponding to a frame of the voice stream; the prediction result includes: whether a current block includes an activation point that needs to be encoded and outputted; determining the position(s) of the activation point(s) that need(s) to be decoded and outputted according to the prediction result, includes: determining position(s) of block(s) including the activation point(s) as the position(s) of the activation point(s).

Clause 3: The method of Clause 2, further comprising: determining Attention coefficients of encoding results of each frame respectively, the Attention coefficients being used to describe probabilities that corresponding frames need to be decoded and outputted; and verifying the prediction result based on the Attention coefficients.

Clause 4: The method of Clause 1, wherein: the block includes encoding results corresponding to a multi-frame voice stream; the method further includes: determining Attention coefficients of encoding results of each frame respectively, the Attention coefficients being used to describe probabilities that corresponding frames need to be decoded and outputted; determining the position(s) of the activation point(s) that need(s) to be decoded and outputted according to the prediction result, includes: comparing the Attention coefficients of each frame in a same block and sort the Attention coefficients in order of magnitudes; and determining positions of frames associated with a corresponding number of first few highest Attention coefficients among encoding results of each frame included in the block as the position(s) of the activation point(s) according to the number of activation points included in the block.

Clause 5: The method of Clause 4, further comprising: adaptively adjust a block size according to a frequency of occurrence of predicted activation points.

Clause 6: The method of any one of Clauses 1 to 5, wherein: performing the block processing on the encoded frames includes: buffering the encoded frames; and determining encoding results of various frames currently buffered as one block when a number of frames associated with encoding results added to a buffer reaches a block size.

Clause 7: The method of Clause 6, further comprising: deleting the encoding results of the various frames of the one block from the buffer after prediction processing of the one block is completed.

Clause 8: A method for establishing a predictive model, comprising: obtaining a training sample set, the training sample set including a plurality of block data and labeling information, wherein each block data frame includes an encoding result of respectively encoding a plurality of frames of a voice stream, and the labeling information includes a number of activation points included in each block that need to be decoded and outputted; and inputting the training sample set into a predictive model for model training.

Clause 9: The method of Clause 8, wherein: the training sample set includes a situation in which multiple frames of the voice stream that correspond to a same modeling unit are divided into different blocks.

Clause 10: A method for providing speech recognition services, comprising: receiving a voice stream provided by an application system after receiving a calling request from the application system; extracting and encoding speech acoustic features of a received voice stream in units of frames; performing block processing on encoded frames, and predicting a number of activation points included in a same block that need to be encoded and outputted; determining a position of an activation point that needs to be decoded and outputted according to a prediction result, to allow a decoder to perform decoding at the position of the activation point to obtain a speech recognition result; and returning the speech recognition result to the application system.

Clause 11: A method for obtaining speech recognition information, comprising: an application system submitting a call request and a voice stream to be recognized to a cloud service system by invoking an interface provided by the cloud service system, the cloud service system extracting speech acoustic features of the received voice stream in units of frames and performing encoding, performing block processing on encoded frames, predicting a number of activation points included in a same block that need to be encoded and outputted, and performing decoding at the position of the activation point to obtain a speech recognition result after determining a position of an activation point that needs to be decoded and outputted according to a prediction result; and receiving the speech recognition result returned by the cloud service system.

Clause 12: A method for implementing court's self-service case filing, comprising: a self-service case-filing all-in-one machine receiving case filing request information through voice input; extracting and encoding speech acoustic features of a received voice stream in units of frames; performing block processing on encoded frames, and predicting a number of activation points included in a same block that need to be encoded and outputted; determining a position of an activation point that needs to be decoded and outputted according to a prediction result, to allow a decoder to perform decoding at the position of the activation point and determine a recognition result; and entering the recognition result into an associated case-filing information database.

Clause 13: A method for upgrading a terminal device, comprising: providing upgrade advice information to the terminal device; and granting the terminal device a permission to perform streaming speech recognition in an upgraded manner after receiving an upgrade request submitted by the terminal device, performing the streaming speech recognition in the upgraded manner including: extracting and encoding speech acoustic features of a voice stream in units of frames, performing block processing on encoded frames, and predicting a number of activation points included in a same block that need to be encoded and outputted; and obtaining a speech recognition result by performing decoding at a position of an activation point through a decoder after determining the position of the activation point based on a prediction result.

Clause 14: The method of Clause 13, wherein: the terminal device includes a smart speaker device.

Clause 15: The method of Clause 13, further comprising: disabling the permission to perform the streaming speech recognition in the upgraded manner for the terminal device according to a downgrade request submitted by the terminal device.

Clause 16: A streaming end-to-end speech recognition apparatus, comprising: an encoding unit configured to extract and encode speech acoustic features of a received voice stream in units of frames; a prediction unit configured to perform block processing on encoded frames, and predict a number of activation points included in a same block that need to be encoded and outputted; and an activation point position determination unit configured to determine position(s) of the activation point(s) that need(s) to be decoded and outputted according to a prediction result, to allow a decoder to perform decoding at the position(s) of the activation point(s) and output a recognition result.

Clause 17: An apparatus for building a predictive model, comprising: a training sample set acquisition unit configured to obtain a training sample set, the training sample set including a plurality of block data and labeling information, wherein each block data frame includes an encoding result of respectively encoding a plurality of frames of a voice stream, and the labeling information includes a number of activation points included in each block that need to be decoded and outputted; and an input unit configured to input the training sample set into a predictive model for model training.

Clause 18: An apparatus for providing speech recognition services, which is applied in a cloud service system, comprising: a voice stream receiving unit configured to receive a voice stream provided by an application system after receiving a calling request from the application system; an encoding unit configured to extract and encode speech acoustic features of a received voice stream in units of frames; a prediction unit configured to perform block processing on encoded frames, and predict a number of activation points included in a same block that need to be encoded and outputted; an activation point position determination unit configured to determine a position of an activation point that needs to be decoded and outputted according to a prediction result, to allow a decoder to perform decoding at the position of the activation point to obtain a speech recognition result; and a recognition result returning unit configured to return the speech recognition result to the application system.

Clause 19: An apparatus for obtaining speech recognition information, which is applied in an application system, comprising: a submission unit configured to submit a call request and a voice stream to be recognized to a cloud service system by invoking an interface provided by the cloud service system, the cloud service system extracting speech acoustic features of the received voice stream in units of frames and performing encoding, performing block processing on encoded frames, predicting a number of activation points included in a same block that need to be encoded and outputted, and performing decoding at the position of the activation point to obtain a speech recognition result after determining a position of an activation point that needs to be decoded and outputted according to a prediction result; and a recognition result receiving unit configured to receive the speech recognition result returned by the cloud service system.

Clause 20: An apparatus for implementing court self-service case filing, which is is applied in a self-service case-filing all-in-one machine, comprising: a request receiving unit configured to receive case filing request information through voice input; an encoding unit configured is used to extract and encode speech acoustic features of a received voice stream in units of frames; a prediction unit configured to perform block processing on encoded frames, and predict a number of activation points included in a same block that need to be encoded and outputted; an activation point position determination unit configured to determine a position of an activation point that needs to be decoded and outputted according to a prediction result, to allow a decoder to perform decoding at the position of the activation point and determine a recognition result; and an information entry unit configured to enter the recognition result into an associated case-filing information database.

Clause 21: An apparatus for upgrading a terminal device, comprising: an upgrade suggestion providing unit configured to provide upgrade advice information to a terminal device; and an authority granting unit configured to grant the terminal device a permission to perform streaming speech recognition in an upgraded manner after receiving an upgrade request submitted by the terminal device, performing the streaming speech recognition in the upgraded manner including: extracting and encoding speech acoustic features of a voice stream in units of frames, performing block processing on encoded frames, and predicting a number of activation points included in a same block that need to be encoded and outputted; and obtaining a speech recognition result by performing decoding at a position of an activation point through a decoder after determining the position of the activation point based on a prediction result.

Clause 22: A computer-readable storage medium on which a computer program is stored, wherein: when the program, when executed by a processor, implements the steps of the method of any one of Clauses 1 to 15.

Clause 23: An electronic device comprising: one or more processors; and memory associated with the one or more processors, the memory being configured to store program instructions that, when read and executed by the one or more processors, execute the steps of the method of any one of Clauses 1 to 15.

What is claimed is:

1. A method implemented by a computing device, comprising:
    extracting and encoding speech acoustic features of a received voice stream in units of frames;
    performing block processing on encoded frames, and predicting a number of activation points included in a same block that need to be encoded and outputted; and
    determining a position of at least one activation point that needs to be decoded and outputted according to a prediction result, to allow a decoder to perform decoding at the position of the at least one activation point and output a recognition result, wherein determining the position of the at least one activation point that needs to be decoded and outputted according to the prediction result, comprises:
        comparing Attention coefficients of each frame in the same block and sort the Attention coefficients in order of magnitudes, the Attention coefficients being used to describe probabilities that respective frames need to be decoded and outputted; and
        determining positions of frames associated with a corresponding number of first few highest Attention coefficients among encoding results of each frame included in the same block as the position of the at least one activation point according to the number of activation points included in the same block.

2. The method of claim 1, wherein:
the same block includes an encoding result corresponding to a frame of the received voice stream; and
the prediction result includes: whether a current block includes an activation point that needs to be encoded and outputted.

3. The method of claim 2, wherein determining the position of the at least one activation point that needs to be decoded and outputted according to the prediction result, comprises:
determining a position of a corresponding block including the at least one activation point as the position of the at least one activation point.

4. The method of claim 1, further comprising:
determining Attention coefficients of encoding results of each frame respectively; and
verifying the prediction result based on the Attention coefficients.

5. The method of claim 1, wherein:
the same block includes encoding results corresponding to a multi-frame voice stream; and
the method further comprises: determining the Attention coefficients.

6. The method of claim 1, further comprising:
adaptively adjust a block size according to a frequency of occurrence of predicted activation points.

7. The method of claim 1, wherein performing the block processing on the encoded frames comprises:
buffering encoding results of the encoded frames; and
determining encoding results of various frames currently buffered as one block when a number of frames associated with the encoding results of the various frames added to a buffer reaches a block size.

8. The method of claim 7, further comprising:
deleting the encoding results of the various frames from the buffer after prediction processing of the block is completed.

9. One or more computer readable media storing executable instructions that, when executed by one or more processors, cause the one or more processors to perform acts comprising:
extracting and encoding speech acoustic features of a received voice stream in units of frames;
performing block processing on encoded frames, and predicting a number of activation points included in a same block that need to be encoded and outputted; and
determining a position of at least one activation point that needs to be decoded and outputted according to a prediction result, to allow a decoder to perform decoding at the position of the at least one activation point and output a recognition result, wherein determining the position of the at least one activation point that needs to be decoded and outputted according to the prediction result, comprises:
comparing Attention coefficients of each frame in the same block and sort the Attention coefficients in order of magnitudes, the Attention coefficients being used to describe probabilities that respective frames need to be decoded and outputted; and
determining positions of frames associated with a corresponding number of first few highest Attention coefficients among encoding results of each frame included in the same block as the position of the at least one activation point according to the number of activation points included in the same block.

10. The one or more computer readable media of claim 9, wherein:
the same block includes an encoding result corresponding to a frame of the received voice stream; and
the prediction result includes: whether a current block includes an activation point that needs to be encoded and outputted.

11. The one or more computer readable media of claim 10, wherein determining the position of the at least one activation point that needs to be decoded and outputted according to the prediction result, comprises:
determining a position of a corresponding block including the at least one activation point as the position of the at least one activation point.

12. The one or more computer readable media of claim 9, the acts further comprising:
determining Attention coefficients of encoding results of each frame respectively; and
verifying the prediction result based on the Attention coefficients.

13. The one or more computer readable media of claim 9, wherein:
the same block includes encoding results corresponding to a multi-frame voice stream; and
the acts further comprise: determining the Attention coefficients.

14. The one or more computer readable media of claim 9, the acts further comprising:
adaptively adjust a block size according to a frequency of occurrence of predicted activation points.

15. The one or more computer readable media of claim 9 wherein performing the block processing on the encoded frames comprises:
buffering encoding results of the encoded frames; and
determining encoding results of various frames currently buffered as one block when a number of frames associated with the encoding results of the various frames added to a buffer reaches a block size.

16. The one or more computer readable media of claim 15, the acts further comprising:
deleting the encoding results of the various frames from the buffer after prediction processing of the block is completed.

17. A system comprising:
one or more processors; and
memory storing executable instructions that, when executed by the one or more processors, cause the one or more processors to perform operations comprising:
extracting and encoding speech acoustic features of a received voice stream in units of frames;
performing block processing on encoded frames, and predicting a number of activation points included in a same block that need to be encoded and outputted; and
determining a position of at least one activation point that needs to be decoded and outputted according to a prediction result, to allow a decoder to perform decoding at the position of the at least one activation point and output a recognition result, wherein determining the position of the at least one activation point that needs to be decoded and outputted according to the prediction result, comprises:
comparing Attention coefficients of each frame in the same block and sort the Attention coefficients in order of magnitudes, the Attention coefficients being used to describe probabilities that respective frames need to be decoded and outputted; and determining positions of frames associated with a corresponding number of first few highest Attention coefficients among encoding results of each frame included in the same block as the position of the at least one activation point according to the number of activation points included in the same block.

18. The system of claim 17, wherein performing the block processing on the encoded frames comprises:
    buffering encoding results of the encoded frames; and
    determining encoding results of various frames currently buffered as one block when a number of frames associated with the encoding results of the various frames added to a buffer.

\* \* \* \* \*